US010019004B2

(12) United States Patent
Takahashi et al.

(10) Patent No.: US 10,019,004 B2
(45) Date of Patent: Jul. 10, 2018

(54) DEVICE, METHOD, AND PROGRAM FOR DETECTING OBJECT

(71) Applicant: Panasonic Intellectual Property Corporation of America, Torrance, CA (US)

(72) Inventors: Masaki Takahashi, Osaka (JP); Yasunori Ishii, Osaka (JP); Kazuki Kozuka, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/462,048

(22) Filed: Mar. 17, 2017

(65) Prior Publication Data

US 2017/0277183 A1 Sep. 28, 2017

(30) Foreign Application Priority Data

Mar. 24, 2016 (JP) .................. 2016-059547
Nov. 10, 2016 (JP) .................. 2016-219460

(51) Int. Cl.
*G05D 1/00* (2006.01)
*G05D 1/02* (2006.01)
(Continued)

(52) U.S. Cl.
CPC .......... *G05D 1/0077* (2013.01); *G05D 1/0246* (2013.01); *G06F 9/4881* (2013.01); *G06N 3/08* (2013.01); *G07C 5/0808* (2013.01)

(58) Field of Classification Search
CPC .. G07C 5/0808; G05D 1/0246; G05D 1/0077; G06N 3/08; G06F 9/4881
See application file for complete search history.

(56) References Cited

U.S. PATENT DOCUMENTS

2004/0155963 A1* 8/2004 Kondo ................... G05B 15/02
348/180
2008/0085131 A1* 4/2008 Kitazawa ........... G03G 15/0266
399/48
(Continued)

FOREIGN PATENT DOCUMENTS

EP          2081131 A1    7/2009
JP          2008-047991   2/2008
JP          2014-021709   2/2014

OTHER PUBLICATIONS

The Extended European Search Report dated Jul. 26, 2017 for the related European Patent Application No. 17162462.0.

*Primary Examiner* — Mussa A Shaawat
(74) *Attorney, Agent, or Firm* — Greenblum & Bernstein, P.L.C.

(57) ABSTRACT

A device that detects an object includes a receiver that receives information about the object detected by a sensor, multiple circuits that detect the object by performing different detection processes, and a control circuit that controls the circuits. The control circuit detects whether the detection circuits are in an abnormal state, based on a change in a state of the circuits, when the control circuit detects that a first circuit of the circuits is in an abnormal state, the control circuit causes the first circuit to stop a detection process being performed by the first circuit and causes one or more circuits, other than the first circuit, to detect the object by causing the one or more circuits to stop performing detection processes performed by the one or more circuits, and to perform detection processes different from the detection processes being performed by the one or more circuits.

14 Claims, 13 Drawing Sheets

(51) Int. Cl.
*G06F 9/48* (2006.01)
*G06N 3/08* (2006.01)
*G07C 5/08* (2006.01)

(56) References Cited

U.S. PATENT DOCUMENTS

2015/0166059 A1* 6/2015 Ko .................. B60W 30/09
 701/28
2016/0350934 A1* 12/2016 Dey .................. H04N 19/44
2017/0315559 A1* 11/2017 Etoh ................. G05D 1/0246

* cited by examiner

| DETECTOR ID | PROCESS | PRIORITY |
|---|---|---|
| OBJECT DETECTOR 113 | SHORT DISTANCE, DETECTION RESULT INTEGRATION | 1 |
| OBJECT DETECTOR 123 | MIDDLE DISTANCE | 2 |
| OBJECT DETECTOR 133 | LONG DISTANCE | 3 |

| DETECTOR ID | PROCESS | PRIORITY |
|---|---|---|
| OBJECT DETECTOR 113 | RESTORATION PROCESS | — |
| OBJECT DETECTOR 123 | LONG AND MIDDLE DISTANCES, DETECTION FREQUENCY 50% | 2 |
| OBJECT DETECTOR 133 | SHORT DISTANCE, DETECTION RESULT INTEGRATION | 1 |

DEVICE, METHOD, AND PROGRAM FOR DETECTING OBJECT

BACKGROUND

1. Technical Field

The present disclosure relates to a device, method, and program that detect an object. For example, the present disclosure relates to a device, method, and program that detect an object from information, such as an image, in a fail-safe manner.

2. Description of the Related Art

Autonomous cars (robotic cars) driven by machines in place of drivers have been actively studied or commercialized in recent years. One of element functions of an autonomous car is a device that detects generic objects (a generic object detection device). A generic object detection device detects generic objects from information, such as an image, transmitted from a camera device, a distance measurement sensor device such as a radar or stereo camera, or the like. Generic objects include pedestrians, vehicles, road signs, buildings, the areas of roads, and the like. The generic object detection device of an autonomous car is required to detect these objects, and the travel controller of the autonomous car is required to control the body of the autonomous car on the basis of detection information from the generic object detection device so that the autonomous car safely moves to the destination.

Accordingly, it is essential to design a generic object detection device in such a manner that it can safely cope with an abnormality that occurs therein. Such a design is called a fail-safe design. Fail-safe is to control a device in the event of an abnormality so that safety is always achieved, and a fail-safe design is one of reliability designs. That is, a fail-safe design assumes that a device or system will inevitably fail.

Japanese Unexamined Patent Application Publication Nos. 2014-21709 and 2008-47991 are examples of the related art.

SUMMARY

However, the above disclosed conventional technologies are fail-safe technologies that cope with a malfunction of a device that acquires information about an object, such as a radar device, and these technologies are not fail-safe technologies relating to a device that detects objects (an object detector). For this reason, there has been a demand to further improve fail-safe technologies relating an object detector.

In one general aspect, the techniques disclosed here feature a device for detecting an object. The device includes a receiver that receives information about the object detected by a sensor; a plurality of detection circuits that detect the object from the received information by performing different detection processes; and a control circuit that controls the detection circuits, wherein the control circuit detects whether the detection circuits are in an abnormal state, on the basis of a change in a state of the detection circuits, wherein, when the control circuit detects that a first detection circuit of the plurality of detection circuits is in an abnormal state, the control circuit causes the first detection circuit to stop a detection process being performed by the first detection circuit and causes one or more detection circuits, other than the first detection circuit, to detect the object by causing the one or more detection circuits to stop performing detection processes performed by the one or more detection circuits, and to perform detection processes different from the detection processes being performed by the one or more detection circuits.

These general and specific aspects may be implemented using a system, a method, and a computer program, and any combination of systems, methods, and computer programs.

According to the present disclosure, even if one of the object detectors is in an abnormal state, the object can be detected in a fail-safe manner with a minimum number of additional elements.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
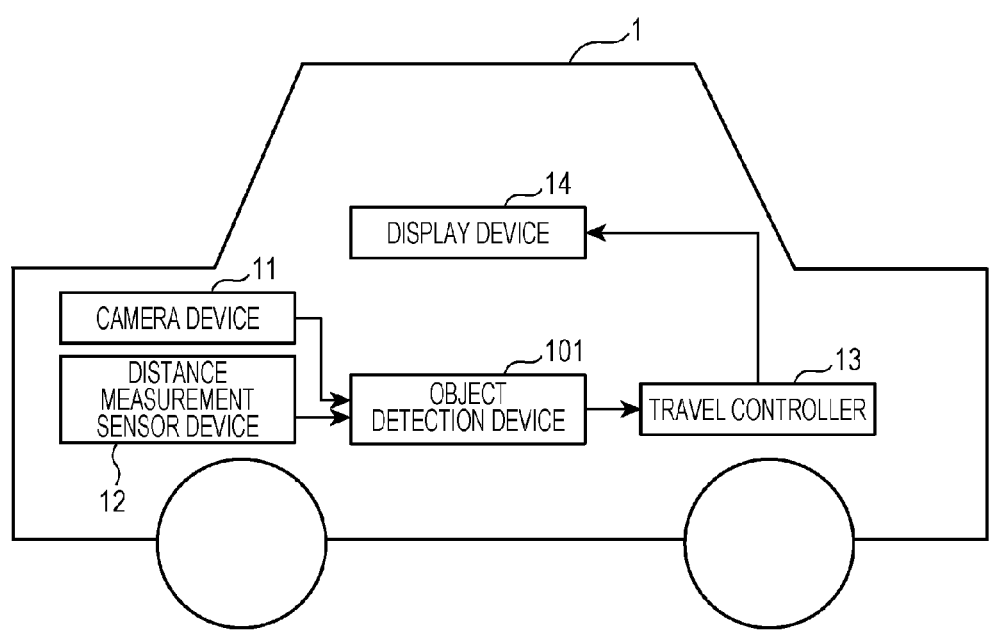
FIG. 1 is a block diagram showing an example of main components of a vehicle having an object detection device of a first embodiment of the present disclosure mounted thereon.

Underlying Knowledge Forming Basis of the Present Disclosure

Japanese Unexamined Patent Application Publication No. 2014-21709 described above discloses an object position detector that is able to estimate the position of an object in the front-back direction even if a radar device has difficulty in determining the position of the object in the front-back direction. This object position detector is characterized in that if a radar failure determination unit determines that the radar device has failed, it estimates the moving direction of the object using a camera device and estimates the position of the object in the front-back direction on the basis of the estimated moving direction. In other words, this object position detector is a fail-safe technology that mainly aims to, if a radar sensor device that inputs a beat signal to an object detector fails, switch the radar sensor device to another device (a camera device) to continue the operation. While Japanese Unexamined Patent Application Publication No. 2014-21709 discloses the fail-safe technology that copes with a malfunction of a device that acquires information about objects, such as a radar device, it does not disclose any fail-safe technology relating to a device that detects objects.

Japanese Unexamined Patent Application Publication No. 2008-47991 described above discloses an image processing device that even if the environment of an area to be monitored changes, is able to improve the object detection performance using an object detection method suitable for the environment. This image processing device uses an object detector suitable for the environment from among multiple object detectors included therein on the basis of information about the environment detected by a sensor different from an image sensor. Since the image processing device of Japanese Unexamined Patent Application Publication No. 2008-47991 includes the multiple object detectors, it may be operated in such a manner that an object detector for fail-safe responds in the event of a failure of one of the object detectors. However, this approach has a problem that a separate object detector for fail-safe is needed. In the field of autonomous cars, there have been proposed various fail-safe technologies that cope with a failure of a camera device or distance measurement sensor device. However, the object detection devices that receive information from the camera device or the like and detect generic objects may fail as well, and any object detector design or technical solution considering fail-safe has not been considered.

In view of the foregoing, the present inventor has conceived of the following improvements.

(1) A device of one aspect of the present disclosure is a device for detecting an object. The device includes a receiver that receives information about the object detected by a sensor; a plurality of detection circuits that detect the object from the received information by performing different detection processes; and a control circuit that controls the detection circuits, wherein the control circuit detects whether the detection circuits are in an abnormal state, on the basis of a change in a state of the detection circuits, wherein, when the control circuit detects that a first detection circuit of the plurality of detection circuits is in an abnormal state, the control circuit causes the first detection circuit to stop a detection process being performed by the first detection circuit and causes one or more detection circuits, other than the first detection circuit, to detect the object by causing the one or more detection circuits to stop performing detection processes performed by the one or more detection circuits, and to perform detection processes different from the detection processes being performed by the one or more detection circuits.

According to this configuration, if an abnormality is detected in one of the detection circuits, the detection process of the detection circuit in which the abnormality has been detected is stopped, and the detection processes of the normal detection circuits are changed. This configuration eliminates the need to newly provide a detection circuit for fail-safe and can cause a normal object detector to perform the detection process of the detection circuit in which the abnormality has been detected instead. As a result, even if one of the object detectors is in an abnormal state, the object can be detected in a fail-safe manner with a minimum number of additional elements.

(2) In the above aspect, the information may include one of image information including at least the object and distance information indicating a distance from the device to the object.

(3) In the above aspect, when the control circuit detects that the first detection circuit of the plurality of detection circuits is in an abnormal state, the control circuit causes, on the basis of priorities assigned to the different detection processes, a second detection circuit to detect the object by causing the second detection circuit to perform a detection process being performed by the first detection circuit, the second detection circuit being a detection circuit that performs a detection process corresponding to the lowest priority, of the one or more detection circuits other than the first detection circuit.

According to this configuration, if an abnormality is detected in one of the detection circuits, the detection process of a normal detection circuit that performs a detection process having the lowest priority, of the normal detection circuits is changed to the detection process of the detection circuit in which the abnormality has been detected. Thus, the normal detection circuit that performs the detection process having the lowest priority can be caused to perform the detection process of the detection circuit in which the abnormality has been detected instead, and the detection process having the high priority can be continued while minimizing the reduction in performance associated with the detection of the object.

(4) In the above aspect, the detection circuits may include at least three or more detection circuits. When the control circuit detects that the first detection circuit of the plurality of detection circuits is an abnormal state, the control circuit may cause a third detection circuit other than the first detection circuit to perform a detection process corresponding to the highest priority of the priorities assigned to the different detection processes and may cause a fourth detection circuit other than the first and third detection circuits to detect the object by causing the fourth detection circuit to perform a detection process corresponding to the second highest priority of the priorities assigned to the different detection processes.

According to this configuration, if an abnormality is detected in one of the detection circuits, one of the normal detection circuits is caused to perform the detection process having the highest priority, and the remaining detection circuit is caused to perform the detection process having the second highest priority. Thus, the detection processes having the high priorities can be reliably continued.

(5) The detection circuits may include at least three or more detection circuits. When the control circuit detects that the first detection circuit of the plurality of detection circuits is an abnormal state, the control circuit may cause a third detection circuit other than the first detection circuit to perform a detection process corresponding to the highest priority of the priorities assigned to the different detection processes and may cause a fourth detection circuit other than the first and third detection circuits to detect the object by causing the fourth detection circuit to perform a detection process being performed by the fourth detection circuit and the detection process being performed by the first detection circuit.

According to this configuration, if an abnormality is detected in one of the detection circuits, one of the normal detection circuits is caused to perform the detection process having the highest priority, and the remaining detection circuit is caused to perform a detection process being performed by the remaining detection circuit as well as the detection process of the detection circuit in which the abnormality has been detected. Thus, all the detection processes can be continued.

(6) In the above aspect, when the first detection circuit stops the detection process being performed by the first detection circuit, the control circuit may perform a restoration process for restoring the first detection circuit to a normal state.

According to this configuration, when the detection circuit in which the abnormality has been detected is being stopped, the restoration process for restoring the detection circuit in which the abnormality has been detected to a normal state is performed. Thus, the detection circuit in which the abnormality has been detected can be restored to a normal state shortly.

(7) In the above aspect, the device may further include a memory. The control circuit may generate neural networks used in the detection processes performed by the detection circuits using a data group stored in the memory and assigns the neural networks to the respective detection circuits. When the control circuit detects that the first detection circuit of the plurality of detection circuits is in an abnormal state, the control circuit may cause the one or more detection circuits other than the first detection circuit to detect the object by causing the one or more detection circuits to stop performing detection processes using neural network assigned to the one or more detection circuits, and to perform detection processes using neural networks different from neural networks being used in the detection processes being performed by the one or more detection circuits.

According to this configuration, neural networks used by the detection circuits are generated using a data group for generating neural networks for detecting the object; the generated neural networks are assigned to the detection circuits; and the detection circuits detect the object using the assigned neural networks. If an abnormality is detected in one of the detection circuits in this state, the neural networks used by the normal detection circuits are changed. As a result, it is possible to eliminate the time taken to generate a new neural network to prevent a blank period time from occurring in the object detection process.

(8) In the above aspect, the memory may store the neural networks in areas thereof. When the control circuit detects that the first detection circuit of the plurality of detection circuits is in an abnormal state, the control circuit may cause the one or more detection circuits other than the first detection circuit to detect the object by causing the one or more detection circuits to perform detection processes using the different neural networks by changing areas of the memory corresponding to the neural networks being used.

According to this configuration, if an abnormality is detected in one of the detection circuits, the neural networks used by the normal detection circuits are changed by changing the individual areas of the memory referred to by the normal detection circuits. Thus, it is possible to instantly change the neural networks used by the normal detection circuits and to reliably continue the detection processes that use the neural networks.

(9) In the above aspect, the detection circuits may have the same specifications.

A according to this configuration, it is possible to cause a normal detection circuit to easily perform the detection process of the detection circuit in which the abnormality has been detected instead and to reduce the cost of the device.

(10) In the above aspect, the sensor may be a predetermined camera; the information may be image information including the object; and the receiver may receive the image information from the predetermined camera.

According to this configuration, generic objects including pedestrians, vehicles, road signs, buildings, the areas of roads, and the like can be detected using image information obtained by capturing an image of objects using the camera.

(11) In the above aspect, the device may be mounted on a vehicle; the vehicle may include a vehicle controller that controls travel of the vehicle; and the control circuit may output a control signal, relating to the travel of the vehicle to the vehicle controller on the basis of a combination of the detection results of the object by the plurality of detection circuits.

According to this configuration, the device is mounted on the vehicle, and the control signal relating to the travel of the vehicle is outputted to the vehicle controller on the basis of the integrated detection result of the object by the detection circuits. Thus, even if an abnormality occurs in a detection circuit, it is possible to detect generic objects including pedestrians, other vehicles, road signs, buildings, the areas of roads, and the like necessary to control the travel of the vehicle and to realize fail-safe autonomous driving control of the autonomous car using the integrated detection result.

(12) In the above aspect, the plurality of detection circuits may further include a second detection circuit and a third detection circuit. The object may include a first object in a first distance range from the vehicle, a second object in a second distance range from the vehicle, and a third object in a third distance range from the vehicle. The first distance range, the second distance range, and the third distance range may be closer to the vehicle in this order. The first detection circuit may perform a first detection process of detecting the first object. The second detection circuit may perform a second detection process of detecting the second object. The third detection circuit may perform a third detection process of detecting the third object. When the control circuit detects that the first detection circuit of the detection circuits is in an abnormal state, the control circuit may cause the first detection circuit to stop the first process and causes the third detection circuit to perform the first process.

According to this configuration, if an abnormality is detected in the first detection circuit, the detection process of the first detection circuit is stopped, and the detection process of the third detection circuit is changed in such a manner that the third detection circuit detects the first object. Thus, even if an abnormality is detected in the first detection circuit, it is possible to detect the first object in the first distance range which is closest to the vehicle, for example, a pedestrian, another vehicle, a road sign, a building, or an area of a road, and to continue the autonomous driving of the autonomous car.

The present disclosure can be implemented not only as the above device including the characteristic elements, but also as a method including characteristic steps corresponding to the characteristic elements of the device, and the like. The present disclosure can also be implemented as a storage medium storing a program for causing a processor to perform the characteristic steps included in this method. Accordingly, the following other aspects can also produce effects similar to those of the above device.

(13) A method of another aspect of the present disclosure is a method for detecting an object. The method includes receiving information about the object detected by a sensor; detecting the object from the information by performing different detection processes; detecting whether the detection processes are in an abnormal state, on the basis of a change in a state of the detection processes; when it is detected that a first detection process of the detection processes is in an abnormal state, stopping the first detection process and detecting the object by performing a different detection process, other than the first detection process.

(14) A storage medium of yet another aspect of the present disclosure is a non-transitory storage media storing a program for detecting an object. The program causes a processor to receive information about the object detected by a sensor; detect the object from the information by performing different detection processes; detect whether the detection processes are in an abnormal state, on the basis of a change in a state of the detection processes; when it is detected that a first detection process of the detection processes is in an abnormal state, stop the first detection process; and detect the object by causing the processor to perform a different detection process, other than the first detection process.

Of course, the above program can be distributed through a communication network such as the Internet. A system may be constructed by distributing some components and others of a device of an embodiment of the present disclosure to multiple computers.

It should be noted that embodiments described below are only illustrative of the present disclosure. The numbers, shapes, elements, steps, the order of the steps, and the like described in the embodiments are only illustrative and are not intended to limit the present disclosure. Of the elements of the embodiments, elements which are not set forth in the independent claims, which represent the highest concepts, are described as optional elements. The descriptions of the embodiments may be combined.

Now, object detection device systems of embodiments of the present disclosure will be described with reference to the drawings.

First Embodiment

FIG. 1 is a block diagram showing an example of main elements of a vehicle having thereon an object detection device of a first embodiment of the present disclosure. As shown in FIG. 1, a vehicle 1 includes a camera device 11, a distance measurement sensor device 12, a travel controller 13, a display device 14, and an object detection device 101. The vehicle 1 is an autonomous car that performs autonomous driving using the travel controller 13 that controls the travel state and the object detection device 101 that detects objects. Note that the vehicle 1 is not limited to an autonomous car and may be an ordinary vehicle driven by a driver.

The camera device 11 is a charge-coupled device (CCD) image sensor or the like. It captures an image of various objects (generic objects) in front of the vehicle 1 and outputs image information about the captured image of the objects to the object detection device 101. The configuration of the camera device 11 is not limited to this example. Multiple camera devices may capture images of objects on the rear, right, left, and other sides of the vehicle 1.

The distance measurement sensor device 12 is a radar device or the like. It measures the distances from the object detection device 101 to various objects (generic objects) in front of the vehicle 1 and outputs distance information indicating the measured distances to the object detection device 101. The configuration of the distance measurement sensor device 12 is not limited to this example. Multiple distance measurement sensor devices may measure the distances from the object detection device 101 to various objects on the rear, right, left, and other sides of the vehicle 1. Image information obtained by imaging distance information indicating the distances from the object detection device 101 to objects using a stereo camera or the like may be outputted.

Since the vehicle 1 is an autonomous car, the object detection device 101 detects objects, such as pedestrians, vehicles, road signs, buildings, and the areas of roads, as generic objects and outputs a control signal (a drive control signal) based on the object detection result to the travel controller 13.

The travel controller 13 is an engine control unit or the like. It controls the travel state of the vehicle 1 on the basis of information including the object detection result of the object detection device 101, as well as automatically controls an accelerator operation, a brake operation, a steering operation, and the like.

The display device 14 is a liquid crystal display mounted on the instrument panel of the vehicle 1, or the like. It displays various types of information outputted from the travel controller 13, such as the state of autonomous driving and the operating state of the object detection device 101.

Figure 2:
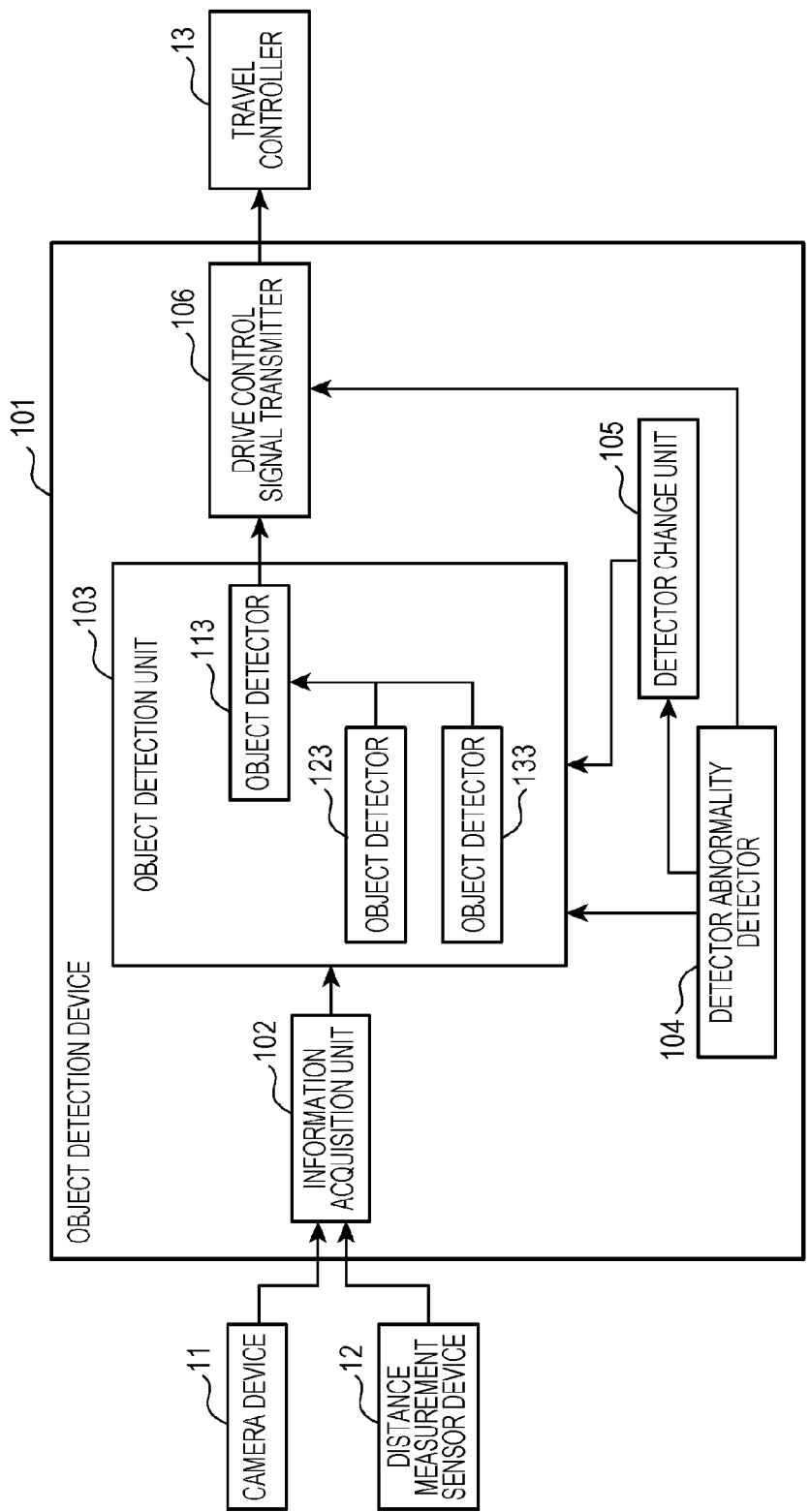
FIG. 2 is a block diagram showing an example of the configuration of the object detection device shown in FIG. 1.

FIG. 2 is a block diagram showing an example of the configuration of the object detection device shown in FIG. 1. As shown in FIG. 2, the object detection device 101 includes an information acquisition unit 102, an object detection unit 103, a detector abnormality detector 104, a detector change unit 105, and a drive control signal transmitter 106. The object detection unit 103 includes three object detectors, 113, 123, 133.

The information acquisition unit 102 acquires, from the camera device 11, image information that is obtained by capturing an image of objects and that serves as object information about objects. It also acquires, from the distance measurement sensor device 12, distance information indicating the distances from the object detection device 101 to the objects. It then outputs the acquired image information and distance information to the object detection unit 103. Note that the object information is not limited to the above example and may be any other types of information about the objects to be detected.

The object detection unit 103 manages the operation of the object detectors 113, 123, 133. Specifically, it provides the image information and distance information outputted from the information acquisition unit 102 to the object detectors 113, 123, 133 to cause the object detectors 113, 123, 133 to perform object detection processes. The object detectors 113, 123, 133 perform predetermined object detection processes using the image information and distance information. The object detectors 113, 123, 133 preferably have the same performance and same configuration. Note that the number and configuration of the object detectors are not limited to the above example and may be changed. For example, two or four or more object detectors may be used, or object detectors having different performance may be used. The information processed by the object detectors is not limited to the above image information and the like. The object detectors may detect generic objects from information indicated by detection signals of any types of sensor devices that use radio waves, heat, sound, infrared rays, or the like.

The object detectors 123, 133 output the detection results of the object detection processes to the object detector 113. The object detector 113 integrates the detection result of itself and the detection results of the object detectors 123, 133 and outputs the integrated detection result to the drive control signal transmitter 106.

The detector abnormality detector 104 detects whether the object detectors 113, 123, 133 are in an abnormal state and reports detector abnormality information reporting an object detector whose abnormal state has been detected, to the detector change unit 105 and drive control signal transmitter 106. For example, the detector abnormality detector 104 detects whether the object detectors 113, 123, 133 are in an abnormal state by monitoring changes in the temperature or power consumption of the object detectors 113, 123, 133 in terms of hardware or by monitoring the frequencies with which the object detectors 113, 123, 133 output detection results, in terms of software. Note that when the object detectors 113, 123, 133 are operating normally, the detector abnormality detector 104 may transmit detector normality information indicating that all the object detectors 113, 123, 133 are normal, to the drive control signal transmitter 106.

The detector change unit 105 controls the object detection unit 103 to change the processes of the object detectors 113, 123, 133. Specifically, if detector abnormality detector 104 detects an abnormal state of one of the object detectors 113, 123, 133, the detector change unit 105 stops the object detection process of the abnormal object detector, whose abnormal state has been detected and changes the object detection processes of the normal object detectors, whose abnormal states have not been detected. When the abnormal object detector is stopping the object detection process, the object detection unit 103 performs a restoration process for restoring the abnormal object detector to a normal state.

The object detection processes of the object detectors 113, 123, 133 have priorities. If the detector abnormality detector 104 detects an abnormal state of one of the object detectors 113, 123, 133, the detector change unit 105 controls the object detection unit 103 to change the object detection process of a normal object detector that performs an object detection process having the lowest priority, of the normal object detectors, whose abnormal states have not been detected, to the object detection process of the abnormal object detector, whose abnormal state has been detected. The detector change unit 105 also controls the object detection unit 103 to cause one of the normal object detectors, whose abnormal states have not been detected, to perform an object detection process having the highest priority and to cause the remaining normal object detector to perform an object detection process having the second highest priority.

The objects detected by the object detection device 101 include a first object in a first distance range, which is a range closest to the vehicle 1, a second object in a second distance range, which is more distant from the vehicle 1 than the first distance range, and a third object in a third distance range, which is more distant from the vehicle 1 than the second distance range. The object detector 113 detects the first object in the first distance range; the object detector 123 detects the second object in the second distance range; and the object detector 133 detects the third object in the third distance range.

If the detector abnormality detector 104 detects an abnormal state of the object detector 113, the detector change unit 105 controls the object detection unit 103 to stop the object detection process of the object detector 113 and to change the object detection process of the object detector 133 so that the object detector 133 detects the first object in the first distance range.

Alternatively, if the detector abnormality detector 104 detects an abnormal state of one of the object detectors 113, 123, 133, the detector change unit 105 may control the object detection unit 103 to cause one of the normal object detectors, whose abnormal states have not been detected, to perform an object detection process having the highest priority and to cause the remaining normal object detector to perform the object detection process being performed by the remaining normal object detector, as well as the object detection process of the abnormal object detector, whose abnormal state has been detected.

The drive control signal transmitter 106 outputs a drive control signal to the travel controller 13 on the basis of the integrated detection result obtained by integrating the detection results of the object detectors 113, 123, 133.

Figures 3, 4:
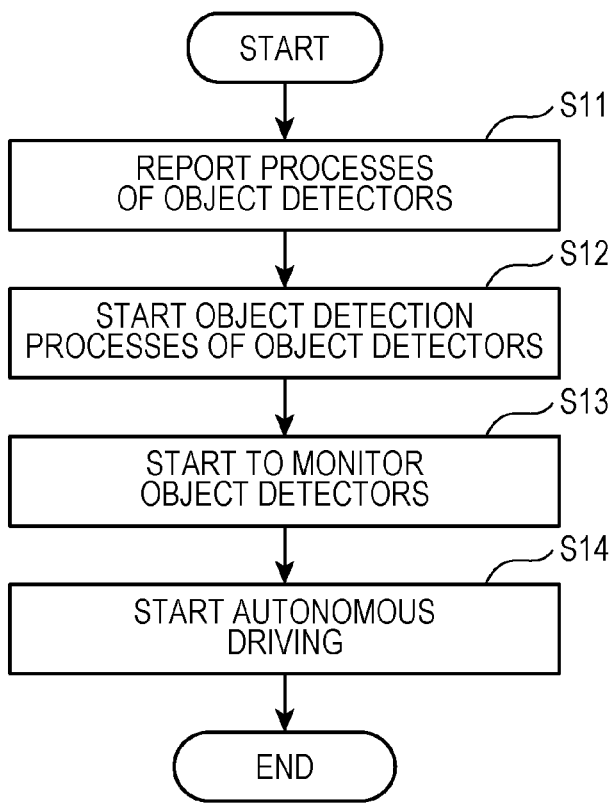
FIG. 3 is a flowchart showing an example of a start-time object detection process of the object detection device shown in FIG. 2.
FIG. 4 is a diagram showing an example of a detection process assignment form used by a detector change unit shown in FIG. 2.

Next, the operation of the object detection device 101 shown in FIG. 2 will be described. FIG. 3 is a flowchart showing an example of a start-time object detection process of the object detection device 101 shown in FIG. 2. The start-time object detection process shown in FIG. 3 is a process performed by the object detection device 101 mounted on the vehicle 1 (autonomous car) when the autonomous driving function is started.

First, the detector change unit 105 reports object detection processes to be performed by the object detectors 113, 123, 133 to the object detection unit 103, which manages the object detectors 113, 123, 133, on the basis of a detection process assignment form stored in an internal memory (not shown) of the detector change unit 105 (step S11).

In this detection process assignment form, detector IDs (identification numbers) identifying object detectors, processes, and priorities are associated with each other in a table format. FIG. 4 is a diagram showing an example of a detection process assignment form used by the detector change unit 105 shown in FIG. 2. As shown in FIG. 4, a detection process assignment form T1 consists of detector IDs T2, which are identifiers associated with the object detectors 113, 123, 133, processes T3 of the detector IDs, and priorities T4 of the processes.

To make the description easy, in the example shown in FIG. 4, "object detector 113," "object detector 123", and "object detector 133" are used as the detector IDs T2; "short distance," "middle distance," "long distance," and "detection result integration" are used as the processes T3; and "1", "2," and "3" are used as the priorities T4. As used herein, "short distance" refers to a process of detecting generic objects at a close distance (in the first distance range) from the vehicle 1. Similarly, "middle distance" refers to a process of detecting generic objects at a middle distance (in the second distance range) from the vehicle 1, and "long distance" refers to a process of detecting generic objects at a long distance (in the third distance range) from the vehicle 1. "Detection result integration" refers to a process of integrating the detection results of the object detectors 113, 123, 133. The priorities T4 mean that a process having a smaller number has a higher priority.

For example, on the basis of the detection process assignment form T1 shown in FIG. 4, the detector change unit 105 requests the object detection unit 103 to set the process of the object detector 113 to "short distance" and "detection result integration" with a priority of "1," the process of the object detector 123 to "middle distance" with a priority of "2," and the process of the object detector 133 to "long distance" with a priority of "3".

While the detection process assignment form is stored in the detector change unit 105 in the above example, it may be stored in a device other than the object detection device 101. The object detection unit 103 may store pair information of the process T3 and priority T4, and the detector change unit 105 may report pair information of the detector ID T2 and priority T4 to the object detection unit 103. While the priorities T4 are determined on the basis of the distances from the object detection device 101 to generic objects, the values of the priorities may be changed in accordance with the types (person, road sign, obstacle, animal, and the like) of generic objects to be detected in the processes T3 (e.g., the priorities may be lowered in the order of person, road sign, obstacle, and animal).

The object detectors 113, 123, 133 are object detectors having the same performance. As a generic object to be detected is more distant, the generic object to be detected is smaller in an image captured by the camera device 11. For this reason, the amount of calculation of the object detector 123 is larger than that of the object detector 113, and the amount of calculation of the object detector 133 is larger than that of the object detector 123.

Accordingly, in the present embodiment, the object detection process time per image (per frame) of the object detector 133 is larger than those of the object detectors 113, 123. For this reason, in the present invention, for example, the information acquisition unit 102 transmits images to the object detection unit 103 at 60 frames per second (FPS). As the detection frequencies, the object detector 113 detects images at 60 FPS; the object detector 123 at 30 FPS; and the object detector 133 at 15 FPS. The object detector 113 integrates the detection results of the object detectors 113, 123, 133 at a detection frequency of 60 FPS.

In other words, while the detection result of the object detector 113 is updated every one frame, the detection result of the object detector 123 is updated every two frames and the detection result of the object detector 133 is updated every four frames. The distances from the object detection device 101 to generic objects are determined on the basis of distance information from the distance measurement sensor device 12. Note that if the distance measurement sensor device 12 is not used, the distances from the object detection device 101 to generic objects may be determined on the basis of the sizes of the image areas of the generic objects in one frame detected by the object detectors 113, 123, 133.

The object detection unit 103 then inputs the image information and the like from the information acquisition unit 102 to the object detectors 113, 123, 133 and causes the object detectors 113, 123, 133 to start to perform object detection processes on the basis of the processes and priorities described in the report, that is, the detection process assignment form from the detector change unit 105 (step S12). In this case, in addition to acquiring the image information from the camera device 11, the information acquisition unit 102 may acquire, from the distance measurement sensor device 12, imaged distance information about the distances from the object detection device 101 to the generic objects. The object detection unit 103 then transmits the generic object detection results from the object detectors 113, 123, 133 to the drive control signal transmitter 106.

Figure 5:
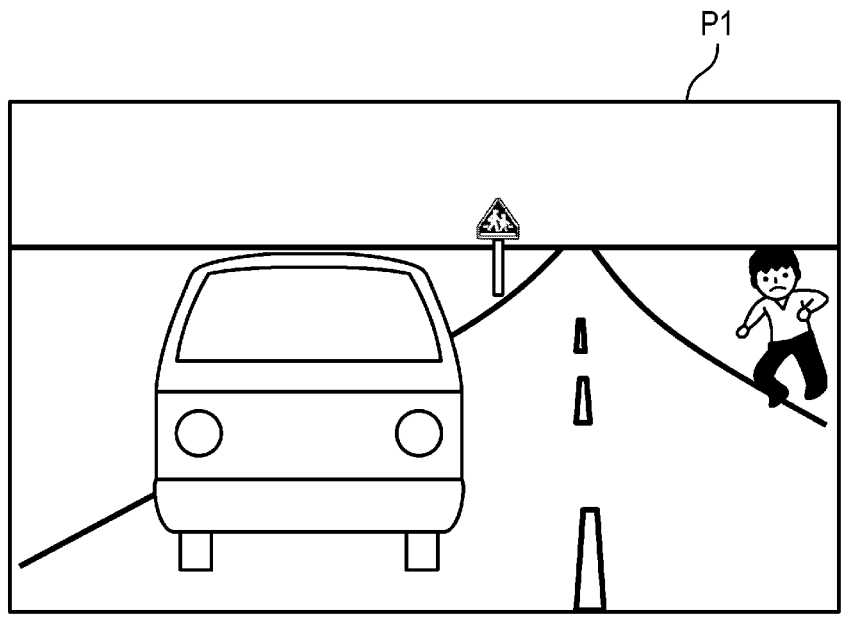
FIG. 5 is a diagram showing an example of an image represented by image information that object detectors shown in FIG. 2 use to perform object detection processes.
Figure 6:
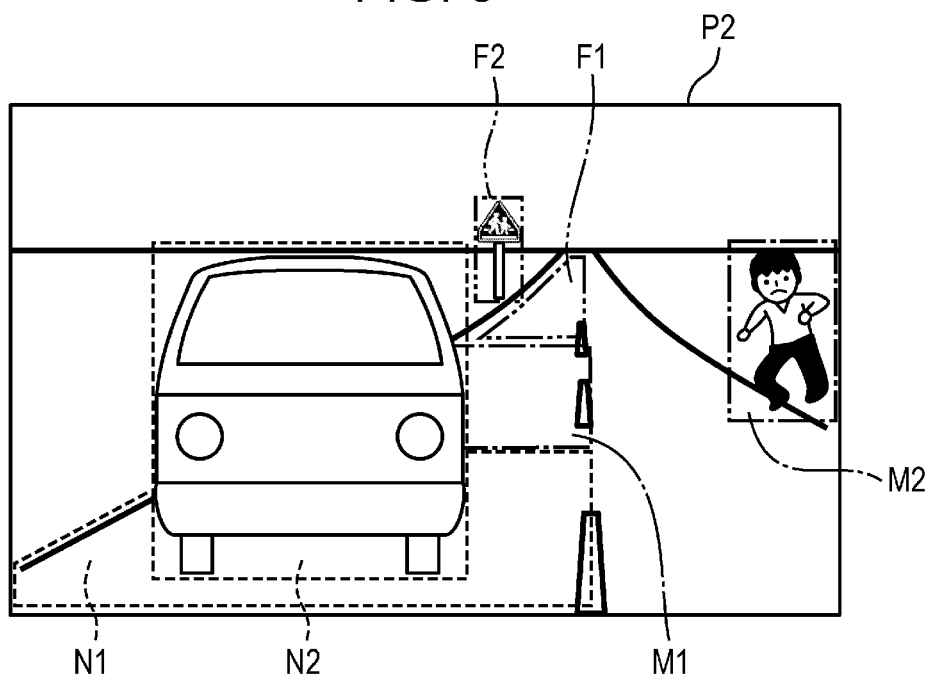
FIG. 6 is a diagram showing an example of objects detected by the object detectors from the image shown in FIG. 5.

FIG. 5 is a diagram showing an example of an image represented by image information that the object detectors 113, 123, 133 shown in FIG. 2 use to perform object detection processes. FIG. 6 is a diagram showing an example of objects detected by the object detectors 113, 123, 133 from the image shown in FIG. 5.

If image information representing a one-frame image P1 shown in FIG. 5 is inputted to the information acquisition unit 102 and the object detectors 113, 123, 133 perform object detection processes on the image P1 transmitted from the information acquisition unit 102, image information representing an image equivalent to a detection result image P2 shown in FIG. 6 is transmitted to the drive control signal transmitter 106.

In the example shown in FIG. 6, on the basis of the detection process assignment form T1, the object detector 113 detects a passable road area N1 and another vehicle N2 as short-distance objects; the object detector 123 detects a passable road area M1 and a person M2 as middle-distance objects; and the object detector 133 detects a passable road area F1 and a road sign F2 as long-distance objects. The object detector 113 integrates these detection results and transmits the integrated detection result to the drive control signal transmitter 106. As seen above, the object detectors 113, 123, 133, which are assigned the processes based on the distances from the object detection device 101, detect generic objects that may be present in the respective distance ranges.

In response to the object detectors 113, 123, 133 starting to perform the object detection processes, the detector abnormality detector 104 starts to monitor the object detectors 113, 123, 133 (step S13). Specifically, the detector abnormality detector 104 detects whether the object detectors 113, 123, 133 are in an abnormal state and reports an object detector whose abnormal state has been detected, to the detector change unit 105 and drive control signal transmitter 106.

The drive control signal transmitter 106 outputs a drive control signal to the travel controller 13 on the basis of the detection result from the object detection unit 103, and the travel controller 13 starts to autonomously drive the vehicle 1 on the basis of the drive control signal (step S14).

Figure 7:
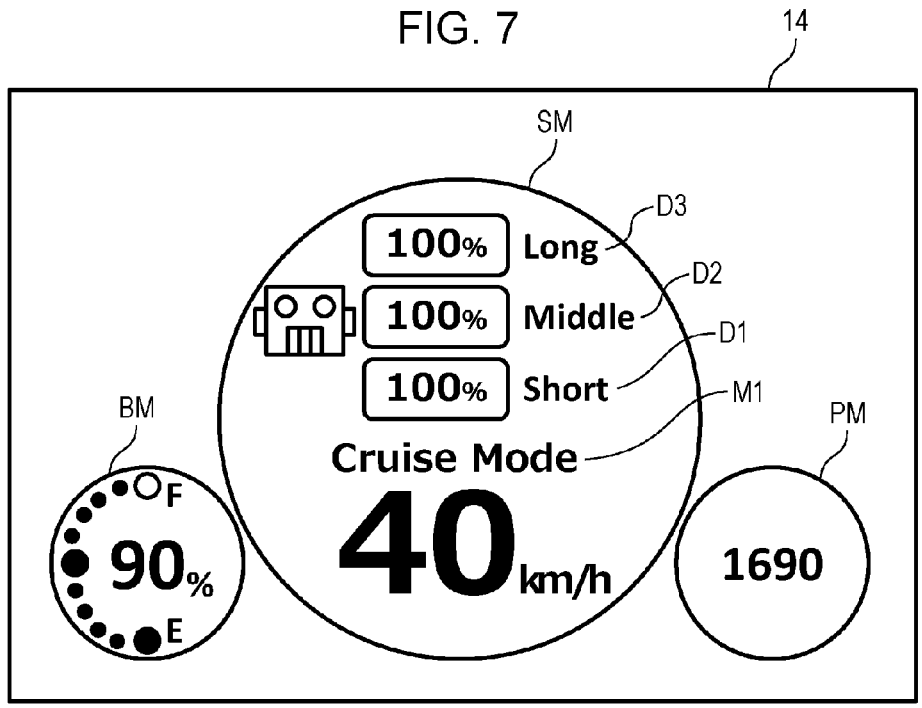
FIG. 7 is a diagram showing an example of an instrument image indicating an autonomous driving state displayed on a display device shown in FIG. 1.

FIG. 7 is a diagram showing an example of an instrument image indicating the autonomous driving state displayed on the display device 14 shown in FIG. 1. When the object detectors 113, 123, 133 are operating normally, an instrument image shown in FIG. 7, for example, is displayed on the display device 14 mounted on the instrument panel of the vehicle 1. Since the vehicle 1 is an electric car in the present embodiment, a remaining battery capacity meter BM, a speedometer SM, and a power meter PM, for example, are displayed as an instrument image.

"Cruise Mode" M1 indicating that autonomous driving is being performed normally is displayed as the drive mode under the center of the speedometer SM; "100% Short" D1 indicating the operating state of the object detector 113 (a state in which it is performing the short-distance object detection process at 100% processing capacity) is displayed over M1; "100% Middle" D2 indicating the operating state of the object detector 123 (a state in which it is performing the middle-distance object detection process at 100% processing capacity) is displayed over D1; and "100% Long" D3 indicating the operating state of the object detector 133 (a state in which it is performing the long-distance object detection process at 100% processing capacity) is displayed over D2.

By displaying an instrument image as described above on the display device 14, the occupant can be notified that autonomous driving is being performed and of the states of the object detectors 113, 123, 133.

What is described above is the process performed by the object detection device 101 of the present embodiment at the start of the autonomous car (at the start of the autonomous driving function).

Figure 8:
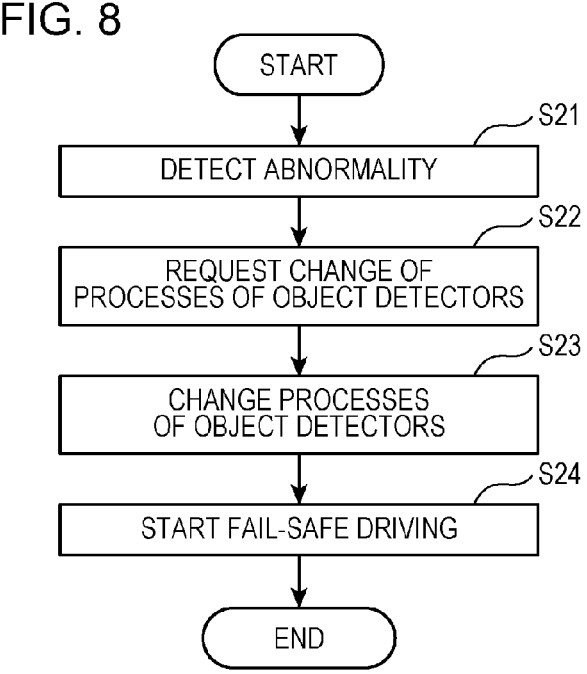
FIG. 8 is a flowchart showing an example of an abnormality-time object detection process performed when an abnormality occurs in one of the object detectors of the object detection device shown in FIG. 2.

Next, a case in which an abnormality occurs in one of the object detectors 113, 123, 133 after starting autonomous driving will be described as an example of the fail-safe operation of the object detection device 101. FIG. 8 is a flowchart showing an example of an abnormality-time object detection process performed when an abnormality occurs in one of the object detectors 113, 123, 133 of the object detection device 101 shown in FIG. 2.

If the detector abnormality detector 104 detects an operation abnormality in one of the object detectors 113, 123, 133, it reports detector abnormality information indicating which object detector is in an abnormal state to the detector change unit 105 and drive control signal transmitter 106 (step S21). For example, if an abnormality occurs in the object detector 113, the detector abnormality detector 104 reports detector abnormality information indicating that the object detector 113 is in an abnormal state to the detector change unit 105 and drive control signal transmitter 106.

The detector change unit 105 receives the detector abnormality information, changes the detection process assignment form to be used from the detection process assignment form T1 shown in FIG. 4 to a detection process assignment form in the case where one of the object detectors 113, 123, 133 is abnormal, and requests the object detection unit 103 to change the processes of the object detectors 113, 123, 133 so that a fail-safe operation corresponding to this detection process assignment form is performed (step S22). As with the detection process assignment form T1 shown in FIG. 4, the detection process assignment form in the case where one of the object detectors 113, 123, 133 is abnormal is stored in the internal memory of the detector change unit 105 for each of abnormal object detectors. The detector change unit 105 reads a detection process assignment form for the abnormal object detector from the internal memory and uses it. Note that the detection process assignment forms for abnormal object detectors need not be stored in the internal memory. For example, a detection process assignment form which allows a proper fail-safe operation to be performed may be generated by the detector change unit 105 or the like on the basis of the processing capacities of the object detectors 113, 123, 133.

Figure 9:
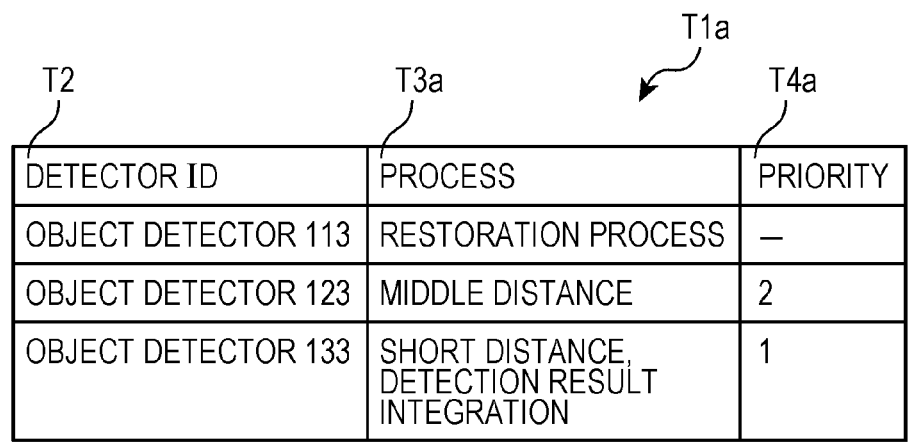
FIG. 9 is a diagram showing an example of a detection process assignment form used by the detector change unit when an abnormality occurs in one of the object detectors shown in FIG. 2.

FIG. 9 is a diagram showing an example of a detection process assignment form used by the detector change unit 105 when an abnormality occurs in the object detector 113 shown in FIG. 2. Processes T3a and priorities T4a in a detection process assignment form T1a shown in FIG. 9 differ from those in the detection process assignment form T1 shown in FIG. 4. Specifically, the process and priority of the object detector 113 are changed to "restoration process" and "-" (no priority); the process and priority of the object detector 133 are changed to "short distance, detection result integration" and "1"; and the process and priority of the object detector 123 are maintained. As used herein, "restoration process" refers to a process of stopping the operation of an abnormal object detector, whose abnormal state has been detected, and restoring the abnormal object detector to a normal state.

For example, if an abnormality occurs in the object detector 113, the detector change unit 105 requests the object detection unit 103 to set the process of the object detector 113 to "restoration process" with a priority "-," the process of the object detector 123 to "middle distance" with a priority "2," and the process of the object detector 133 to "short distance" and "detection result integration" with a priority "1," on the basis of the detection process assignment form T1a shown in FIG. 9.

The object detection unit 103 changes the processes of the object detectors 113, 123, 133 on the basis of the detection process assignment form in the case where one of the object detectors 113, 123, 133 is abnormal and outputs the integrated detection result of the changed processes to the drive control signal transmitter 106 (step S23). For example, if an abnormality occurs in the object detector 113, the object detection unit 103 performs a "restoration process" for restoring the object detector 113 to a normal state, on the basis of the process T3a of the object detector 113. The object detection unit 103 also changes the object detection process of the object detector 133 to "short distance, detection result integration" with "a priority of 1," on the basis of the process T3a and priority T4a of the object detector 133.

Figure 10:
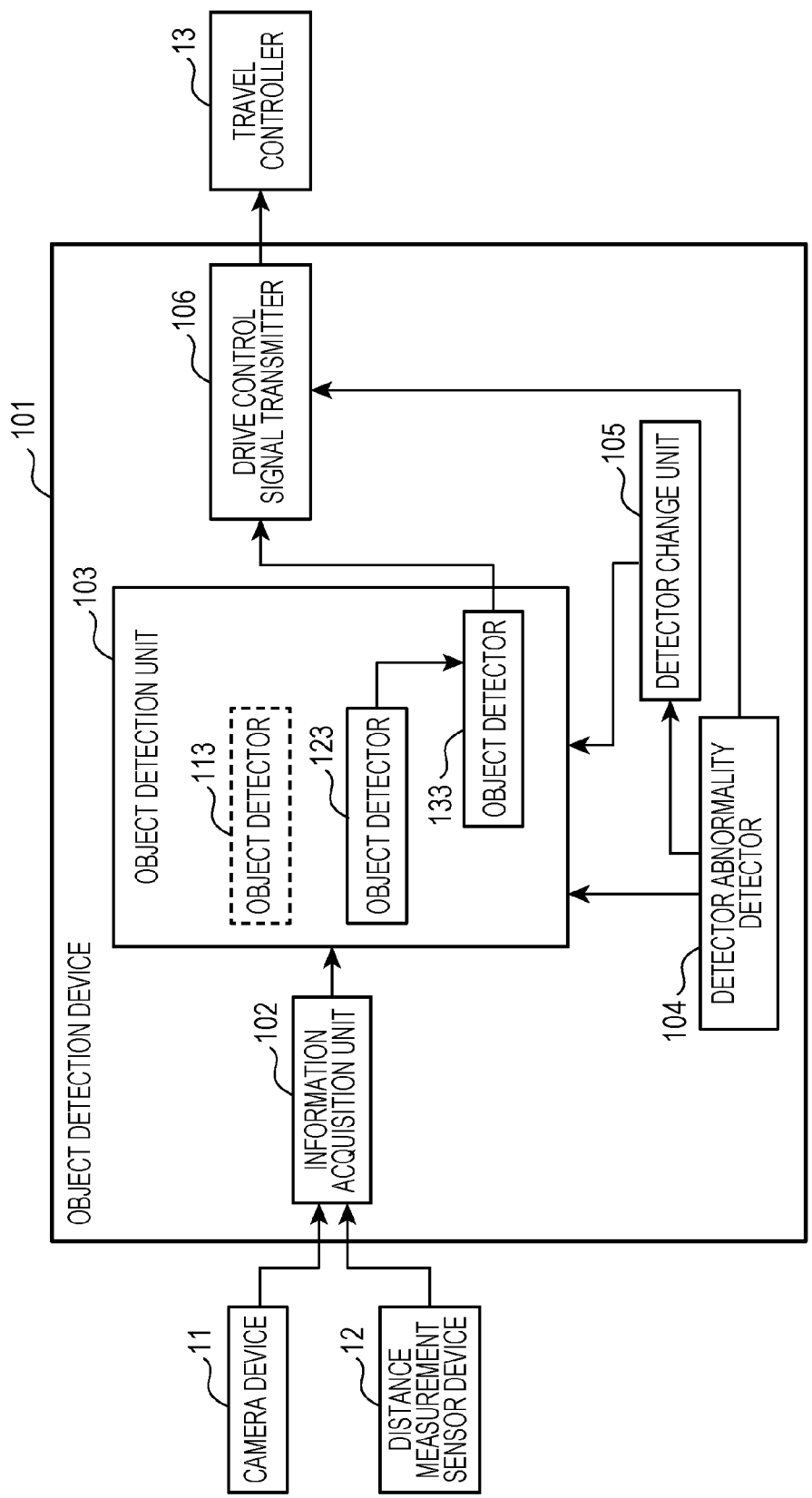
FIG. 10 is a block diagram showing an example of a fail-safe operation performed when an abnormality occurs in one of the object detectors of the object detection device shown in FIG. 2.

FIG. 10 is a block diagram showing an example of a fail-safe operation performed when an abnormality occurs in the object detector 113 of the object detection device 101 shown in FIG. 2. As shown in FIG. 10, if an abnormality occurs in the object detector 113, the object detection unit 103 performs a restoration process for restoring the object detector 113 to a normal state. The object detector 123 performs a middle-distance object detection process with a priority of 2 and outputs the detection result to the object detector 133. The object detector 133 performs a short-distance object detection process with a priority of 1 and a detection result integration process and outputs the integrated detection result to the drive control signal transmitter 106.

The drive control signal transmitter 106 transmits, to the travel controller 13 of the vehicle 1, a drive control signal for performing fail-safe driving, such as the reduction of the travel speed of the vehicle 1 or the stop of the vehicle in a safe place, on the basis of detector abnormality information and the integrated detection result from the object detection unit 103 (step S24).

Figures 11, 12:
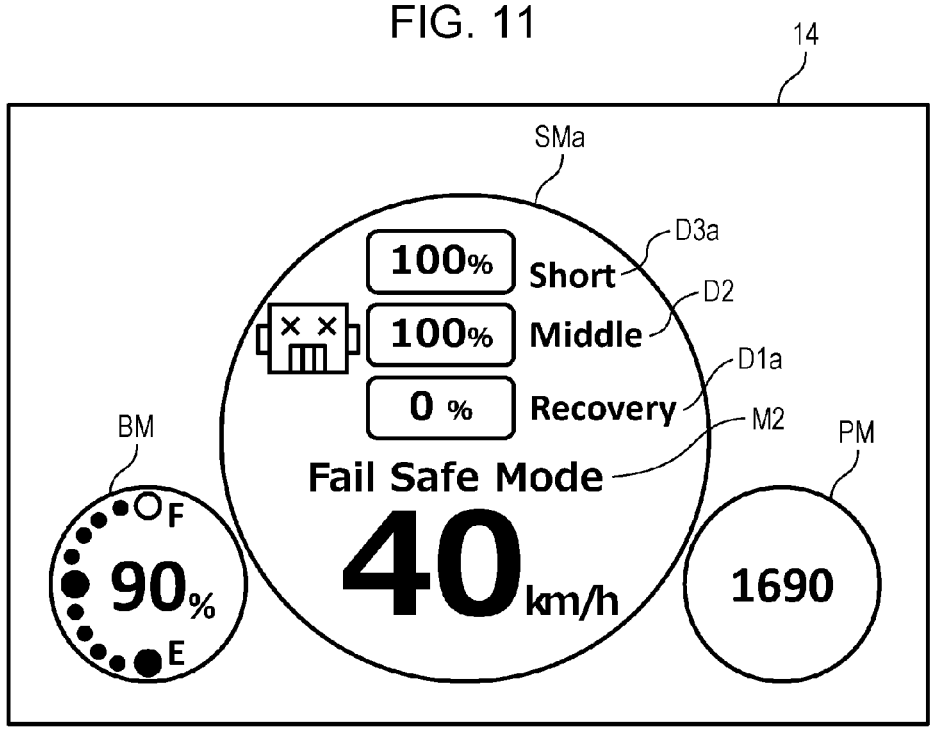
FIG. 11 is a diagram showing an example of an instrument image displayed on the display device when an abnormality occurs in one of the object detectors shown in FIG. 2.
FIG. 12 is a diagram showing another example of a detection process assignment form used by the detector change unit when an abnormality occurs in one of the object detectors shown in FIG. 2.

FIG. 11 is a diagram showing an example of an instrument image displayed on the display device 14 when an abnormality occurs in one of the object detectors 113, 123, 133 shown in FIG. 2. For example, if an abnormality occurs in the object detector 113 and the abnormality-time object detection process shown in FIG. 8 is performed, the instrument image shown in FIG. 11 is displayed on the display device 14 mounted on the instrument panel of the vehicle 1. In this example, as in FIG. 7, a remaining battery capacity meter BM and a power meter PM are displayed as an instrument image, but the display content of a speedometer SMa differs from that in FIG. 7.

Specifically, "Fail Safe Mode" M2 indicating that fail-safe driving is being performed is displayed as the drive mode under the center of the speedometer SMa; "0%

Recovery" D1a indicating that the object detector 113 is in an abnormal state, an object detection process is stopped, and a restoration process is being performed is displayed over M2; "100% Middle" D2 indicating the operating state of the object detector 123 (a state in which it is performing a middle-distance object detection process at 100% processing capacity) is displayed over D1a; and "100% Short" D3a indicating the operating state of the object detector 133 (a state in which it is performing a short-distance object detection process at 100% processing capacity) is displayed over D2.

By displaying an instrument image as described above on the display device 14, the occupant can be notified that the object detector 113 is in the middle of restoration and the vehicle is in a fail-safe driving state for avoiding a risk.

The process of the present embodiment described above includes if an abnormal state of one of the object detectors 113, 123, 133 is detected, stopping the object detection process of the abnormal object detector, whose abnormal state has been detected, and changing the object detection processes of the normal object detectors, whose abnormal states have not been detected. Thus, the need to newly provide an object detector for fail-safe is eliminated, and the normal object detector can be caused to perform the object detection process of the abnormal object detector instead. As a result, even if one of the object detectors 113, 123, 133 is in an abnormal state, objects can be detected in a fail-safe manner with a minimum number of additional elements.

Note that if an abnormal state of one of the object detectors 113, 123, 133 is detected, the object detection process of the normal object detector, whose abnormal state has not been detected, need not be changed as shown in FIG. 9 and may be changed in other ways. For example, depending on the state or external environment of the vehicle 1, the object detection process of the normal object detector may be changed on the basis of a detection process assignment form as shown in FIG. 12.

FIG. 12 is a diagram showing another example of a detection process assignment form used by the detector change unit 105 when an abnormality occurs in the object detector 113 shown in FIG. 2. The processes and priorities of the object detectors 113, 133 and the priority of the object detector 123 in a detection process assignment form T1b shown in FIG. 12 are the same as those in the detection process assignment form T1a shown in FIG. 9. On the other hand, the process of the object detector 123 is changed to a process T3b, that is, "long distance and short distance, detector frequency 50%."

In the present embodiment, a short-distance object detection process is usually performed at a detection frequency of 60 FPS; a middle-distance object detection process is usually performed at a detection frequency of 30 FPS; and a long-distance object detection process is usually performed at a detection frequency of 15 FPS. On the other hand, in the example shown in FIG. 12, if an abnormality occurs in the object detector 113, the object detector 123 detects generic objects on the basis of the process T3b thereof in the detection process assignment form T1b while allocating half the calculation resources thereof to a middle-distance object detection process and another half to a long-distance object detection process. Thus, the detection frequency of a short-distance object detection process is changed to 60 FPS; that of a middle-distance object detection process to 15 FPS; and that of a long-distance object detection process to 7 FPS.

As seen above, if an abnormal state of the object detector 113 is detected, the object detector 133 is caused to perform a short-distance object detection process and detection result integration process having the highest priority, and the object detector 123 is caused to perform a middle-distance object detection process being performed thereby, as well as a long-distance object detection process. Thus, all the object detection processes can be continued.

Second Embodiment

Figure 13:
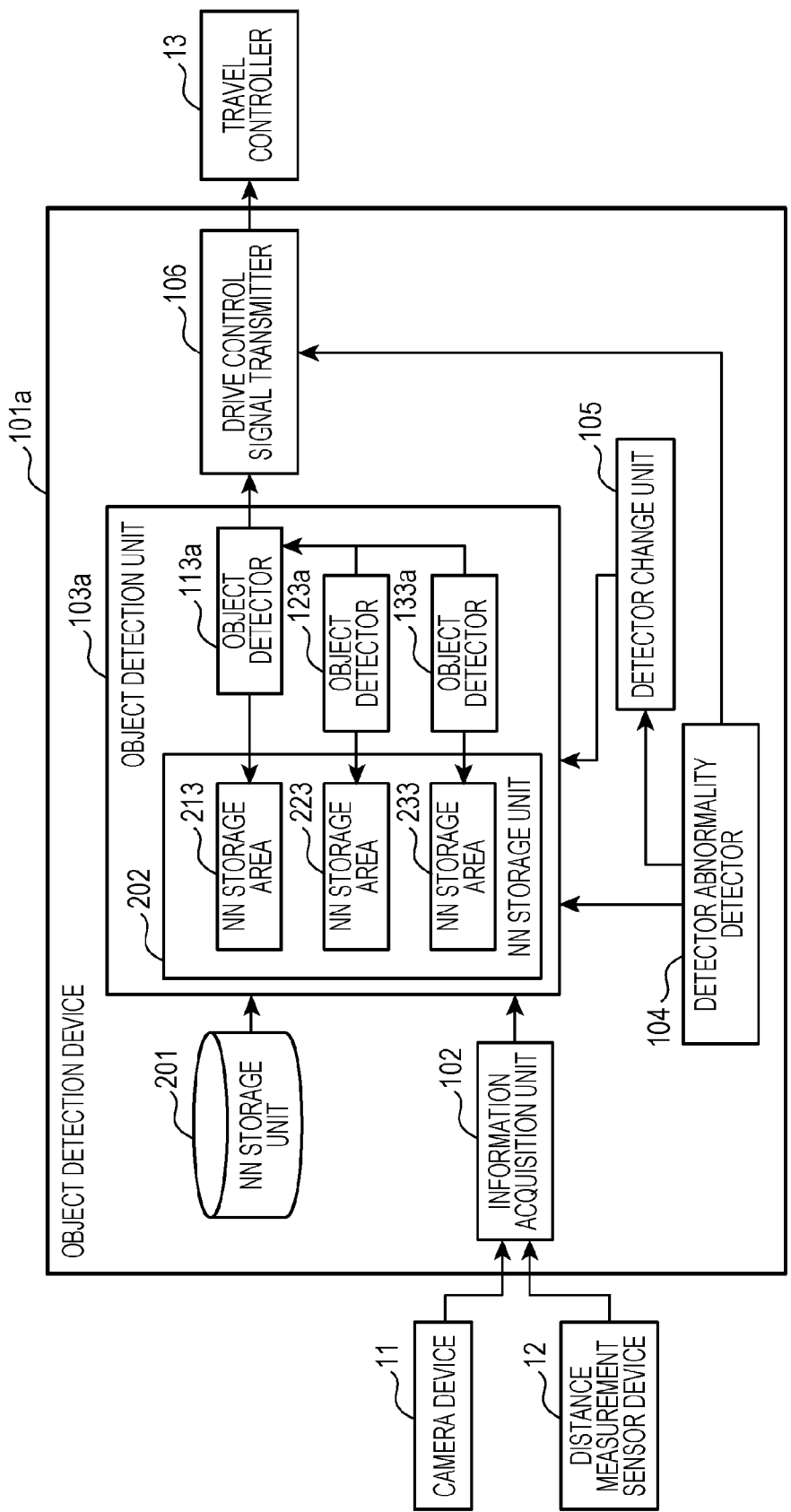
FIG. 13 is a block diagram showing an example of the configuration of an object detection device of a second embodiment of the present disclosure.

FIG. 13 is a block diagram showing an example of the configuration of an object detection device of a second embodiment of the present disclosure. In the present embodiment, an object detection device 101a using neural networks (hereafter referred to as "NNs") in an autonomous car will be described with reference to FIG. 13. The object detection device 101a shown in FIG. 13 is basically similar to the object detection device 101 shown in FIG. 2 except that it performs object detection processes using neural networks described below. For this reason, the same elements are given the same reference signs and will not be described repeatedly.

As shown in FIG. 13, the object detection device 101a includes an information acquisition unit 102, an object detection unit 103a, a detector abnormality detector 104, a detector change unit 105, a drive control signal transmitter 106, and a neural network (NN) storage unit 201. The object detection unit 103a includes three object detectors, 113a, 123a, 133a, and a neural network (NN) storage unit 202. The NN storage unit 202 includes three neural network (NN) storage areas, 213, 223, 233, as individual storage areas.

As generic object detectors using NNs, object detectors using NNs that have performed learning using a technique called "deep learning" have been used in recent years. Such object detectors can achieve high detection performance and have replaced conventional object detectors that use manually designed feature values. In the present embodiment, object detection processes are performed using neural networks that have performed learning using deep learning as follows.

The NN storage unit 201 stores neural network (NN) generation data as a data group for generating neural networks for detecting objects. As used herein, "NN generation data" refers to data in which parameters about nodes necessary to generate NNs that have performed purpose-specific learning using the deep learning technique, an inter-node network configuration, and the like are defined. Note that NN generation data may be acquired in other ways. For example, the NN storage unit 201 may be omitted, and NN generation data may be acquired from a predetermined server or the like through a predetermined network.

The object detection unit 103a reads the NN generation data from the NN storage unit 201, generates neural networks to be used by the object detectors 113a, 123a, 133a using the NN generation data, and stores the generated neural networks in the storage areas 213, 223, 233 of the NN storage unit 202. Note that the configuration of the NN storage unit 202 is not limited to the above example. For example, the neural networks may be stored in the individual storage areas. Also, the memory areas (the storage areas 213, 223, 233) storing the generated neural networks may be made redundant to increase fault tolerance and may be duplicated to areas that the object detectors 113a, 123a, 133a can refer to.

The object detector 103a manages the operation of the object detectors 113a, 123a, 133a and provides image information and distance information outputted from the information acquisition unit 102 to the object detectors 113a, 123a, 133a. The object detector 103a also assigns the neural networks in the storage areas 213, 223, 233 to the object detectors 113a, 123a, 133a in accordance with the processes of the object detectors 113a, 123a, 133a based on a detection process assignment form from the detector change unit 105.

The object detectors 113a, 123a, 133a perform object detection processes using the image information and distance information from the information acquisition unit 102 and the assigned neural networks. The object detectors 113a, 123a, 133a are preferably object detectors having the same performance and same configuration.

The object detectors 123a, 133a output, to the object detector 113a, the object detection results of the object detection processes using the assigned neural networks. The object detector 113a integrates the detection result of itself and the detection results of the object detectors 123a, 133a and outputs the integrated detection result to the drive control signal transmitter 106.

The detector abnormality detector 104 detects whether the object detectors 113a, 123a, 133a are in an abnormal state and reports detector abnormality information reporting an object detector whose abnormal state has been detected, to the detector change unit 105 and drive control signal transmitter 106.

The detector change unit 105 controls the object detection unit 103a to change the processes of the object detectors 113a, 123a, 133a. Thus, if detector abnormality detector 104 detects an abnormal state of one of the object detectors 113a, 123a, 133a, the detector change unit 105 stops the object detection process of the abnormal object detector, whose abnormal state has been detected, and changes the object detection processes of the normal object detectors, whose abnormal states have not been detected. When the abnormal object detector is stopping the object detection process, the object detection unit 103a performs a restoration process for restoring the abnormal object detector to a normal state.

Also, the detector change unit 105 changes the storage areas 213, 223, 233 of the NN storage unit 202 referred to by the normal object detectors to change the neural networks used by the normal object detectors.

Figure 14:
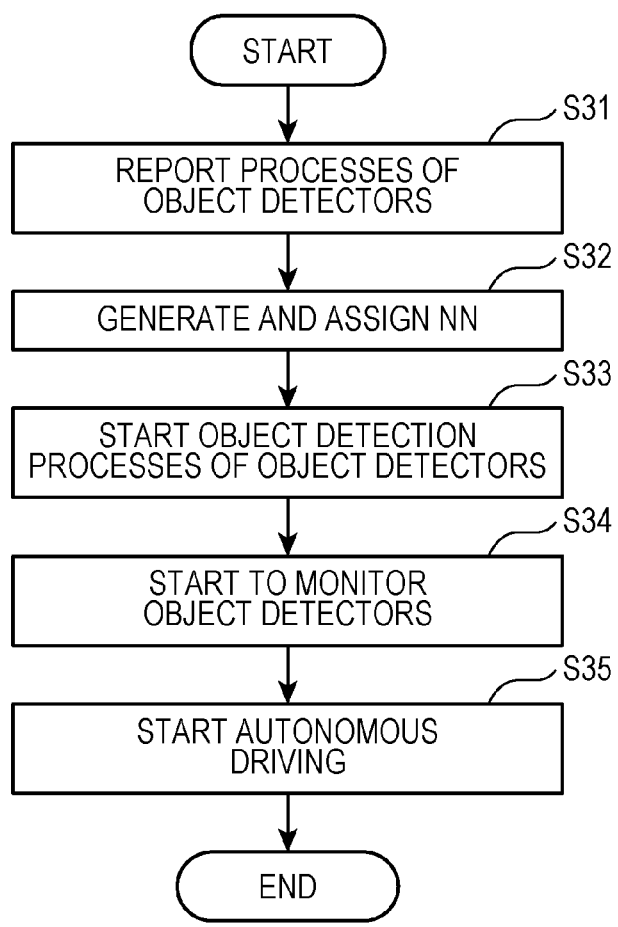
FIG. 14 is a flowchart showing an example of a start-time object detection process of the object detection device shown in FIG. 13.

Next, the operation of the object detection device 101a shown in FIG. 13 will be described. FIG. 14 is a flowchart showing an example of a start-time object detection process of the object detection device 101a shown in FIG. 13. The object detection process shown in FIG. 14 is a process performed by the object detection device 101a mounted on the vehicle 1 (autonomous car) (see FIG. 1) when the autonomous driving function is started.

First, the detector change unit 105 reports object detection processes performed by the object detectors 113a, 123a, 133a to the object detection unit 103a, which manages the object detectors 113a, 123a, 133a, on the basis of a detection process assignment form (e.g., the detection process assignment form shown in FIG. 4) stored in the internal memory of the detector change unit 105 (step S31).

Then, the object detector 103a reads the NN generation data from the NN storage unit 201 on the basis of the information reported from the detector change unit 105, generates neural networks for the object detectors 113a, 123a, 133a, stores the generated neural networks in the NN storage areas 213, 223, 233, and assigns the neural networks in the NN storage areas 213, 223, 233 to the object detectors 113a, 123a, 133a (step S32).

Figure 15:
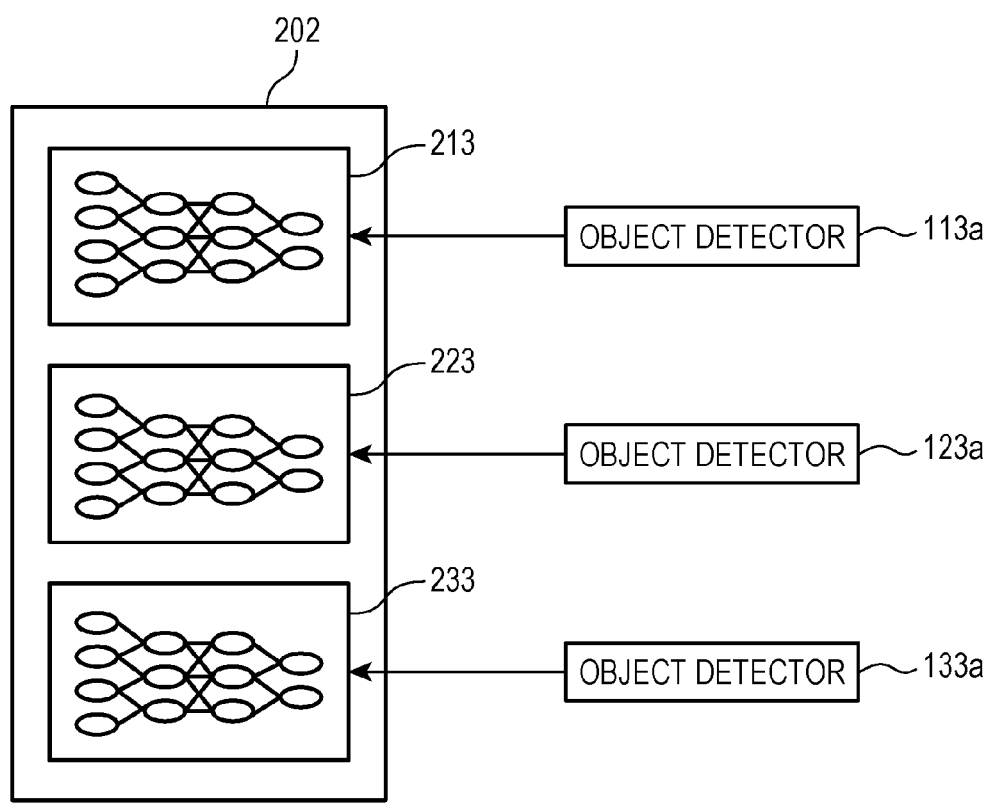
FIG. 15 is a diagram showing an example of NN storage areas referred to by the object detectors of the object detection device shown in FIG. 13.

FIG. 15 is a diagram showing an example of the NN storage areas 213, 223, 233 referred to by the object detectors 113a, 123a, 133a of the object detection device 101a shown in FIG. 13. In the example shown in FIG. 15, a neural network for a short-distance object detection process is stored in the NN storage area 213 of the NN storage unit 202; a neural network for a middle-distance object detection process is stored in the NN storage area 223; and a neural network for a long-distance object detection process is stored in the NN storage area 233.

At this time, the object detector 103a assigns the NN storage area 213 to the object detector 113a, the NN storage area 223 to the object detector 123a, the NN storage area 233 to the object detector 133a. Thus, the object detector 113a uses the neural network for a short-distance object detection process with reference to the NN storage area 213; the object detector 123a uses the neural network for a middle-distance object detection process with reference to the NN storage area 223; and the object detector 133a uses the neural network for a long-distance object detection process with reference to the NN storage area 233.

The object detection unit 103a then inputs the image information and the like from the information acquisition unit 102 to the object detectors 113a, 123a, 133a and causes the object detectors 113a, 123a, 133a to start to perform object detection processes on the basis of the processes and priorities described in the report, that is, the detection process assignment form from the detector change unit 105 using the neural networks in the NN storage areas 213, 223, 233 (step S33).

In response to the object detection unit 103a starting to perform the object detection processes, the detector abnormality detector 104 starts to monitor the object detectors 113a, 123a, 133a (step S34).

Then, the drive control signal transmitter 106 outputs a drive control signal to the travel controller 13 on the basis of the detection result from the object detection unit 103a, and the travel controller 13 starts to autonomously drive the vehicle 1 on the basis of the drive control signal (step S35).

What is described above is the process performed by the object detection device 101a of the present embodiment at the start of the autonomous car (at the start of the autonomous driving function).

Figure 16:
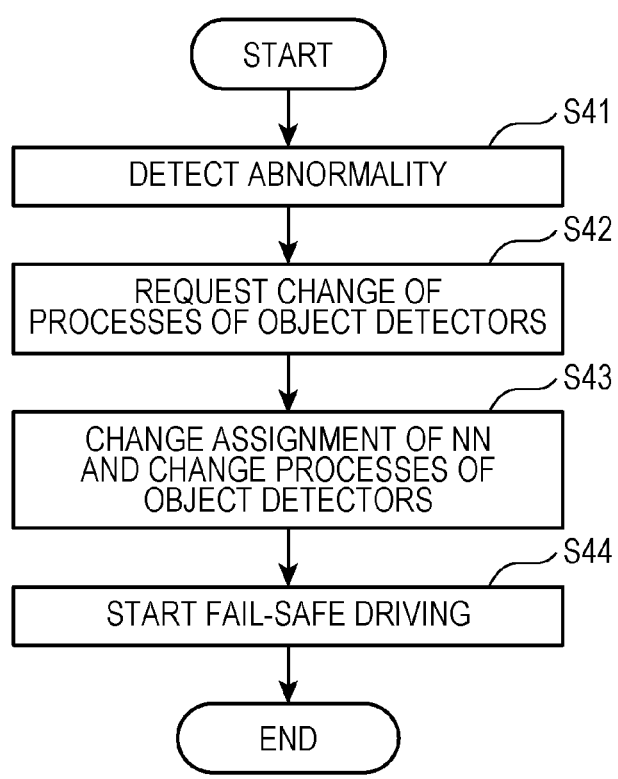
FIG. 16 is a flowchart showing an example of an abnormality-time object detection process performed when an abnormality occurs in one of the object detectors of the object detection device shown in FIG. 13.

Next, a case in which an abnormality occurs in one of the object detectors 113a, 123a, 133a after starting autonomous driving will be described as an example of the fail-safe operation of the object detection device 101a. FIG. 16 is a flowchart showing an example of an abnormality-time object detection process performed when an abnormality occurs in one of the object detectors 113a, 123a, 133a of the object detection device 101a shown in FIG. 13.

If the detector abnormality detector 104 detects an operation abnormality in one of the object detectors 113a, 123a, 133a, it reports detector abnormality information indicating which object detector is in an abnormal state to the detector change unit 105 and drive control signal transmitter 106 (step S41). For example, if an abnormality occurs in the object detector 113a, the detector abnormality detector 104 reports detector abnormality information indicating that the object detector 113a is in an abnormal state to the detector change unit 105 and drive control signal transmitter 106.

The detector change unit 105 receives the detector abnormality information, changes the detection process assignment form to be used from the detection process assignment form T1 shown in FIG. 4 to a detection process assignment form in the case where one of the object detectors 113a, 123a, 133a is abnormal (e.g., the detection process assignment form T1a shown in FIG. 9), and requests the object detection unit 103a to change the processes of the object detectors 113a, 123a, 133a so that a fail-safe operation corresponding to this detection process assignment form is performed (step S42).

The object detector 103a changes the assignment of the neural networks in the NN storage areas 213, 223, 233 to the object detectors 113a, 123a, 133a on the basis of the detection process assignment form in the case where one of the object detectors 113a, 123a, 133a is abnormal, to change the NN storage areas 213, 223, 233 referred to by the object detectors 113a, 123a, 133a. Thus, the object detector 103a changes the processes of the object detectors 113a, 123a, 133a and outputs the integrated detection result of the changed processes to the drive control signal transmitter 106 (step S43). For example, if an abnormality occurs in the object detector 113a, the object detection unit 103a performs a "restoration process" for restoring the object detector 113a to a normal state on the basis of the process T3a of the object detector 113a and changes the object detection process of the object detector 133a to "short distance, detection result integration" with "a priority of 1" on the basis of the process T3a and priority T4a of the object detector 133a.

Figure 17:
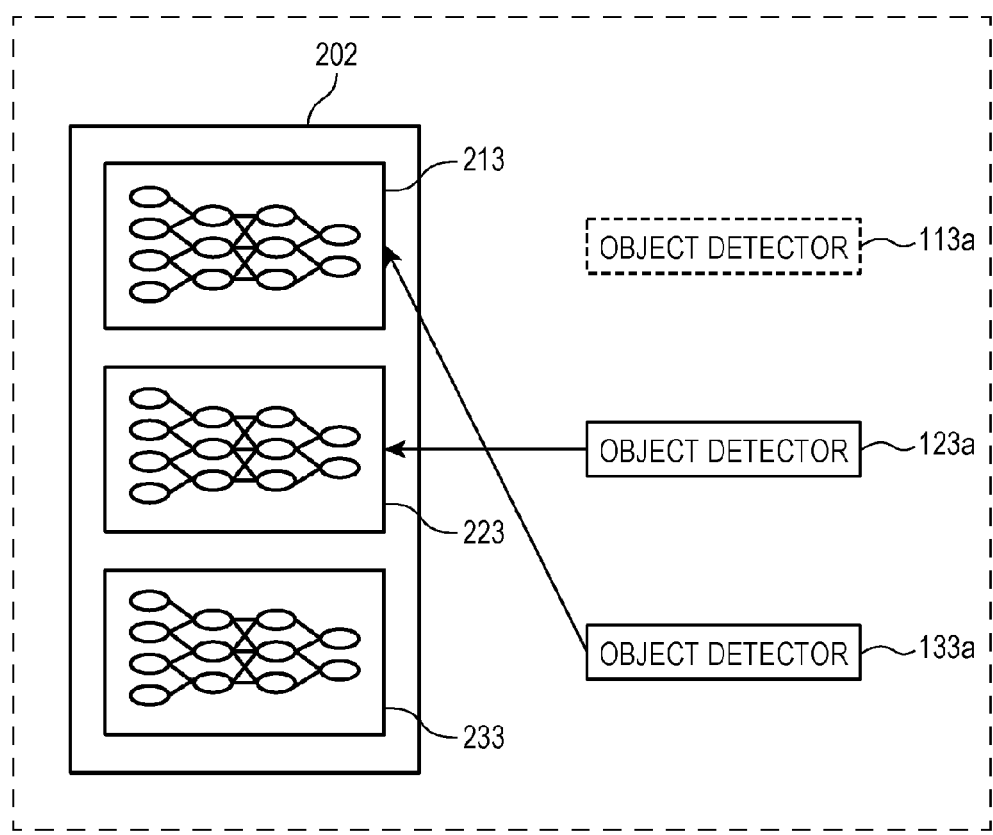
FIG. 17 is a diagram showing an example of the NN storage areas referred to by the object detectors of the object detection device shown in FIG. 13 when an abnormality occurs in one of the object detectors.

FIG. 17 is a diagram showing an example of the NN storage areas 213, 223, 233 referred to by the object detectors 113a, 123a, 133a of the object detection device 101a shown in FIG. 13 when an abnormality occurs in one of the object detectors 113a, 123a, 133a. The example shown in FIG. 17 shows a case in which an abnormality has occurred in the object detector 113a. The object detector 103a stops the object detector 113a and assigns the NN storage area 223 to the object detector 123a and the NN storage area 213 to the object detector 133a.

Thus, the object detector 133a uses a neural network for a short-distance object detection process with reference to the NN storage area 213, and the object detector 123a uses a neural network for a middle-distance object detection process with reference to the NN storage area 223.

The drive control signal transmitter 106 transmits, to the travel controller 13 of the vehicle 1, a drive control signal for performing fail-safe driving, such as the reduction of the travel speed of the vehicle 1 or the stop of the vehicle in a safe place, on the basis of the detector abnormality information and the integrated detection result from the object detection unit 103a (step S44).

In addition to the effects of the first embodiment, the process of the present embodiment described above includes if an abnormal state of one of the object detectors 113a, 123a, 133a is detected, changing the NN storage areas 213, 223, 233 referred to by the normal object detectors. Thus, the neural networks used by the normal object detectors, whose abnormal states have not been detected, are changed. As a result, if an abnormal state of one of the object detectors 113a, 123a, 133a is detected, it is possible to eliminate the time taken to generate a new neural network to prevent a blank period time from occurring in the object detection process. Thus, even if an abnormal state of one of the object detectors 113a, 123a, 133a is detected, it is possible to instantly change the neural networks used by the normal object detectors and to reliably continue the object detection processes that use the neural networks. As a result, an interruption of autonomous driving can be prevented.

While, in the above embodiments, the object detection device of the present disclosure is applied to the autonomous car, it can also be applied to other product fields, such as robots and drones (unmanned flying objects).

The elements described in the embodiments may be implemented as software. In this case, the software is stored in a non-transitory storage medium, such as one or more read-only memories (ROMs), an optical disc, or a hard disk drive, and when the software is executed by a processor, functions specified by the software are performed by the processor and peripheral devices.

The elements described in the embodiments may also be implemented as large scale integration (LSI), which is a typical integrated circuit. The LSI may be implemented as individual chips, or part or all thereof may be implemented as one chip. While the integrated circuit here is referred to as LSI, it may be referred to as IC (semiconductor integrated circuit), system LSI, super LSI, or ultra LSI depending on the degree of integration. The method for forming an integrated circuit is not limited to LSI and may be to use a dedicated circuit or general-purpose processor. After manufacturing LSI, a field programmable gate array (FPGA) may be used, or a reconfigurable processor, which can reconfigure the connection or setting of the circuit cells in LSI, may be used. If an integrated circuit technology which replaces LSI appears due to the progress of the semiconductor technology or due to a derived technology, the elements may be integrated using that technology, as a matter of course.

The object detection device of the present disclosure is able to minimize the addition of elements to a fail-safe object detection device and to make further improvements and is useful as a device that detects objects.

What is claimed is:

1. A device for detecting an object, comprising:
   a receiver that receives information about the object detected by a sensor;
   a plurality of detection circuits that detect the object from the received information by performing different detection processes; and
   a control circuit that controls the plurality of detection circuits, wherein
   the control circuit detects whether the plurality of detection circuits are in an abnormal state, on the basis of a change in a state of the plurality of detection circuits,
   wherein, in response to the control circuit detecting that a first detection circuit of the plurality of detection circuits is in an abnormal state, the control circuit causes the first detection circuit to stop a detection process being performed by the first detection circuit and causes one of other detection circuits than the first detection circuit to take over the detection process performed by the first detection circuit.

2. The device of claim 1, wherein the information includes one of image information including at least the object and distance information indicating a distance from the device to the object.

3. The device of claim 1, wherein
   in response to the control circuit detecting that the first detection circuit of the plurality of detection circuits is in an abnormal state, the control circuit causes, on the basis of priorities assigned to the different detection processes, a second detection circuit to take over the detection process being performed by the first detection circuit, the second detection circuit being a detection circuit that performs a detection process corresponding to the lowest priority, of the other detection circuits than the first detection circuit.

4. The device of claim 3, wherein
   the plurality of detection circuits comprise at least three detection circuits, and
   in response to the control circuit detecting that the first detection circuit of the plurality of detection circuits is an abnormal state, the control circuit causes a third detection circuit other than the first detection circuit, to perform a detection process corresponding to the highest priority of the priorities assigned to the different detection processes and causes a fourth detection circuit, other than the first and third detection circuits, to perform a detection process corresponding to the second highest priority of the priorities assigned to the different detection processes.

5. The device of claim 3, wherein
the plurality of detection circuits comprise at least three detection circuits, and
in response to the control circuit detecting that the first detection circuit of the plurality of detection circuits is an abnormal state, the control circuit causes a third detection circuit other than the first detection circuit, to perform a detection process corresponding to the highest priority of the priorities assigned to the different detection processes and causes a fourth detection circuit, other than the first and third detection circuits, to perform a detection process being performed by the fourth detection circuit and to take over the detection process being performed by the first detection circuit.

6. The device of claim 1, wherein, when the first detection circuit stops the detection process being performed by the first detection circuit, the control circuit performs a restoration process for restoring the first detection circuit to a normal state.

7. The device of claim 1, further comprising a memory, wherein
the control circuit generates neural networks used in the detection processes performed by the plurality of detection circuits using a data group stored in the memory and assigns the neural networks to the respective detection circuits, and
in response to the control circuit detecting that the first detection circuit of the plurality of detection circuits is in an abnormal state, the control circuit causes one or more detection circuits, other than the first detection circuit, to stop performing the detection processes using the neural networks assigned to the one or more detection circuits, and to perform the detection processes using neural networks different from neural networks being used in the detection processes being performed by the one or more detection circuits.

8. The device of claim 7, wherein
the memory stores the neural networks in areas, and
in response to the control circuit detecting that the first detection circuit of the plurality of detection circuits is in an abnormal state, the control circuit causes the one or more detection circuits, other than the first detection circuit, to perform the detection processes using the different neural networks by changing the areas of the memory corresponding to the neural networks being used.

9. The device of claim 1, wherein the plurality of detection circuits have identical specifications.

10. The device of claim 1, wherein
the sensor comprises a camera,
the information comprises image information including the object, and
the receiver receives the image information from the camera.

11. The device of claim 1, wherein
the device is mounted on a vehicle,
the vehicle comprises a vehicle controller that controls travel of the vehicle, and
the control circuit outputs a control signal, relating to the travel of the vehicle, to the vehicle controller on the basis of a combination of the detection results of the object by the plurality of detection circuits.

12. The device of claim 11, wherein
the plurality of detection circuits further comprise a second detection circuit and a third detection circuit,
the object comprises a first object in a first distance range from the vehicle, a second object in a second distance range from the vehicle, and a third object in a third distance range from the vehicle,
the first distance range, the second distance range, and the third distance range are closer to the vehicle in this order,
the first detection circuit performs a first detection process of detecting the first object,
the second detection circuit performs a second detection process of detecting the second object,
the third detection circuit performs a third detection process of detecting the third object, and
in response to the control circuit detecting that the first detection circuit of the plurality of detection circuits is in an abnormal state, the control circuit causes the first detection circuit to stop the first detection process and causes the third detection circuit to take over the first detection process.

13. A method for detecting an object, comprising:
receiving information about the object detected by a sensor;
detecting the object from the information by performing each of different detection processes in each of a plurality of detection circuits;
detecting whether the detection processes are in an abnormal state, on the basis of a change in a state of the detection processes;
in response to a detection that a first detection process, of the detection processes, performed in a first detection circuit of the plurality of detection circuits is in an abnormal state, stopping the first detection process performed in the first detection circuit and causing a second detection circuit of the plurality of the detection circuits other than the first detection circuit to take over the first detection process.

14. A non-transitory storage media storing a program for detecting an object, the program causing a processor to:
receive information about the object detected by a sensor;
detect the object from the information by performing each of different detection processes in each of a plurality of detection circuits;
detect whether the detection processes are in an abnormal state, on the basis of a change in a state of the detection processes;
in response to a detection that a first detection process, of the detection processes, performed in a first detection circuit of the plurality of detection circuits is in an abnormal state, stop the first detection process performed in the first detection circuit; and
assign the first detection process to a second detection circuit of the plurality of the detection circuits other than the first detection circuit to cause the second detection circuit to take over the first detection process.

* * * * *